(12) United States Patent
Wentworth et al.

(10) Patent No.: US 8,167,258 B1
(45) Date of Patent: May 1, 2012

(54) CLAMP FOR CONNECTING TWO ELONGATED MEMBERS AND METHOD OF USE

(76) Inventors: Stuart H. Wentworth, Alamo, CA (US); Claudia H. Wentworth, Alamo, CA (US)

( * ) Notice: Subject to any disclaimer, the term of this patent is extended or adjusted under 35 U.S.C. 154(b) by 224 days.

(21) Appl. No.: 12/653,696

(22) Filed: Dec. 17, 2009

(51) Int. Cl.
*A47B 96/06* (2006.01)

(52) U.S. Cl. ............ 248/214; 248/237; 248/228.1; 52/44; 52/719; 403/385; 403/396; 403/400

(58) Field of Classification Search .......... 248/237, 248/214, 219.1, 219.3, 229.1, 229.12, 229.2, 248/229.22, 228.1, 510; 52/44, 299, 719; 403/385, 387, 394, 396, 400
See application file for complete search history.

(56) References Cited

U.S. PATENT DOCUMENTS

| | | | | |
|---|---|---|---|---|
| 1,745,814 A * | 2/1930 | Sadler | ............ | 248/540 |
| 1,931,400 A * | 10/1933 | Williams | ............ | 403/385 |
| 1,950,635 A * | 3/1934 | Steinmayer | ............ | 439/792 |
| 2,891,296 A * | 6/1959 | Darde | ............ | 403/391 |
| 2,942,898 A * | 6/1960 | Matthysse | ............ | 403/385 |
| 3,096,110 A * | 7/1963 | Cantor | ............ | 403/385 |
| 3,368,782 A * | 2/1968 | Welch | ............ | 248/68.1 |
| 3,379,414 A * | 4/1968 | Thurnauer | ............ | 256/68 |
| 3,958,519 A * | 5/1976 | Merkle, Jr. | ............ | 110/332 |
| 4,379,651 A * | 4/1983 | Nagashima | ............ | 403/387 |
| 4,784,514 A * | 11/1988 | Pantev | ............ | 403/391 |
| 5,146,724 A * | 9/1992 | Angelo | ............ | 52/299 |
| 5,163,644 A * | 11/1992 | Kowalski | ............ | 248/74.4 |
| 5,183,232 A * | 2/1993 | Gale | ............ | 248/220.22 |
| 5,498,098 A * | 3/1996 | Cairns | ............ | 403/400 |
| 6,343,891 B1 * | 2/2002 | Combs | ............ | 403/391 |
| 6,471,171 B1 * | 10/2002 | VanderVelde | ............ | 248/229.12 |
| 2004/0108425 A1 * | 6/2004 | Alperson | ............ | 248/219.1 |
| 2004/0195479 A1 * | 10/2004 | Gulley | ............ | 248/228.1 |
| 2006/0038094 A1 * | 2/2006 | Simmons | ............ | 248/188 |
| 2009/0134288 A1 * | 5/2009 | Kao | ............ | 248/214 |

\* cited by examiner

*Primary Examiner* — Bradley Duckworth
(74) *Attorney, Agent, or Firm* — Ted Masters

(57) ABSTRACT

A clamp for perpendicularly connecting two elongated members includes first and second interchangeable half clamps. The half clamps are placed in opposing relationship and tightened around the perpendicular junction of the two elongated members. In one embodiment, the clamp is designed to connect a beam (such as an I-beam) to a ridge (such as that found on a standing seam roof). In another embodiment the clamp is designed to connect two beams together.

4 Claims, 13 Drawing Sheets

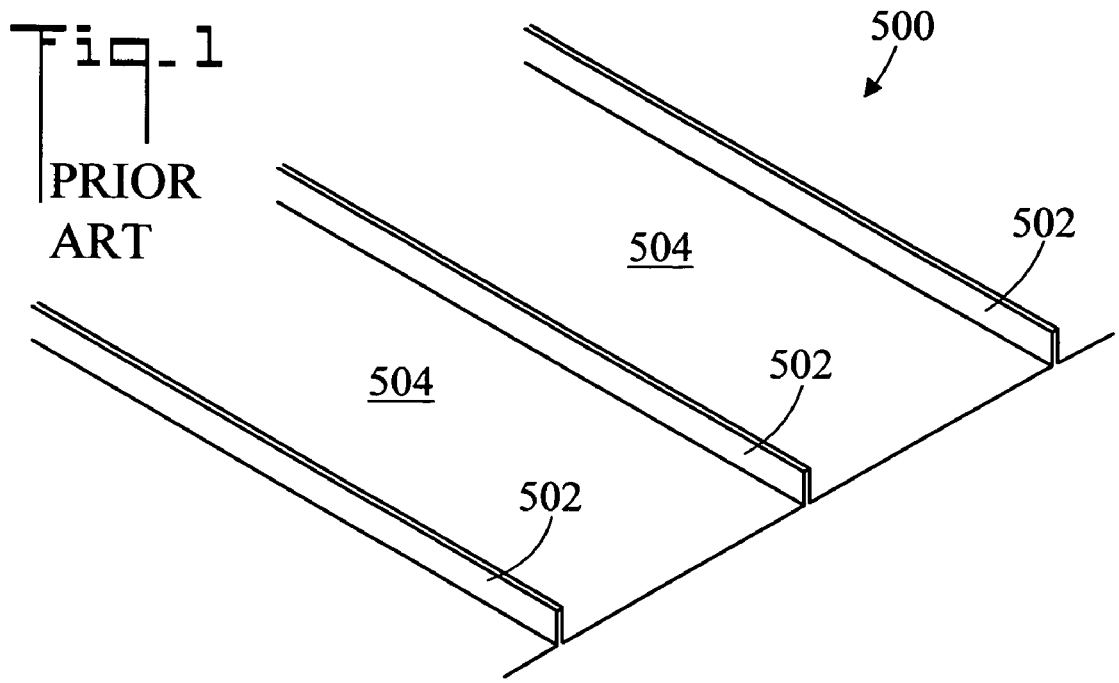
Fig-1 PRIOR ART
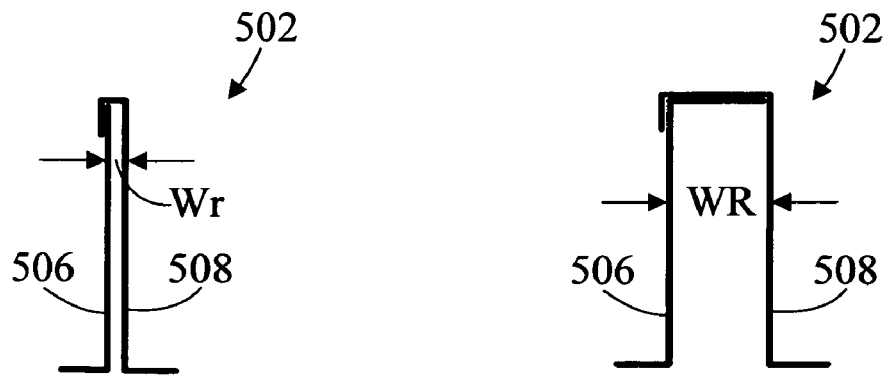
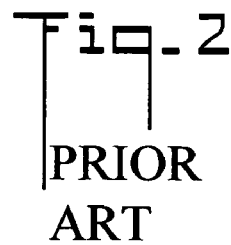
Fig-2 PRIOR ART
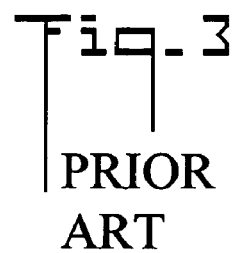
Fig-3 PRIOR ART

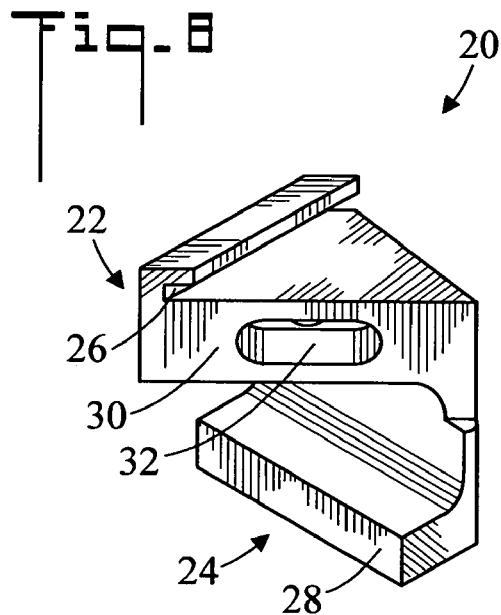
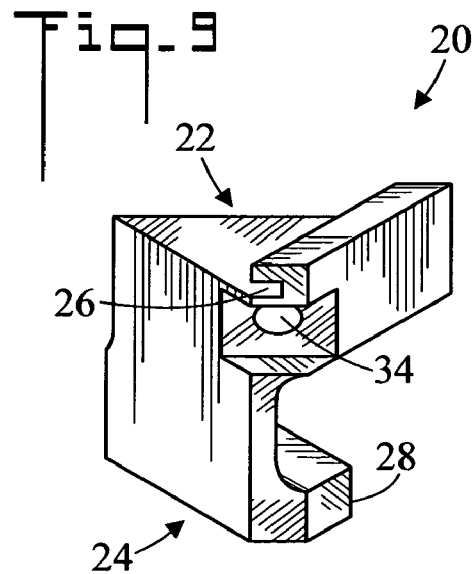
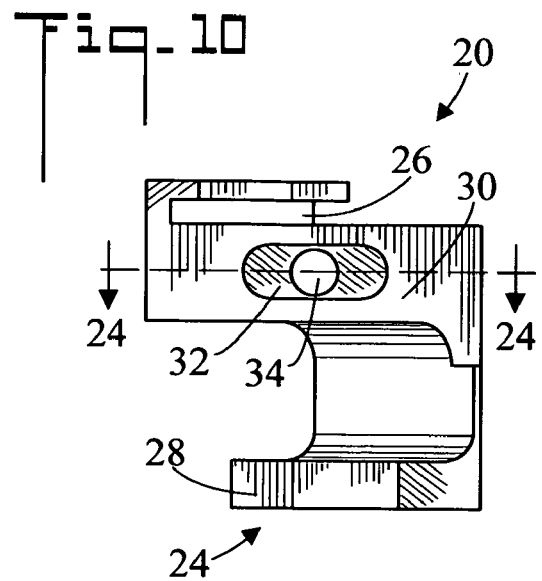
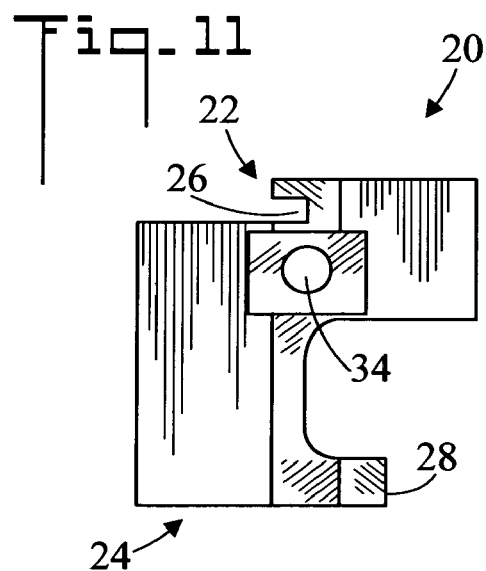

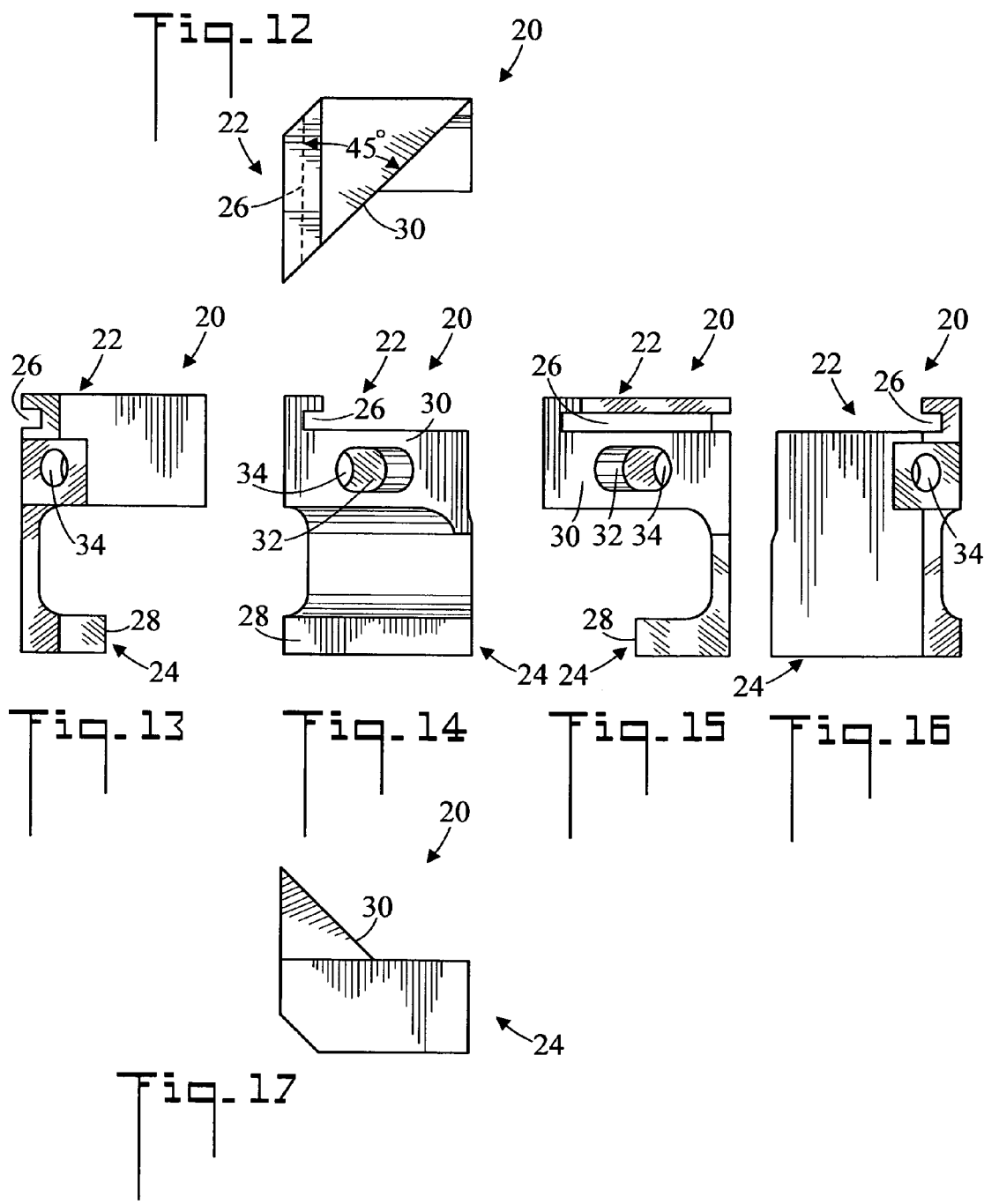

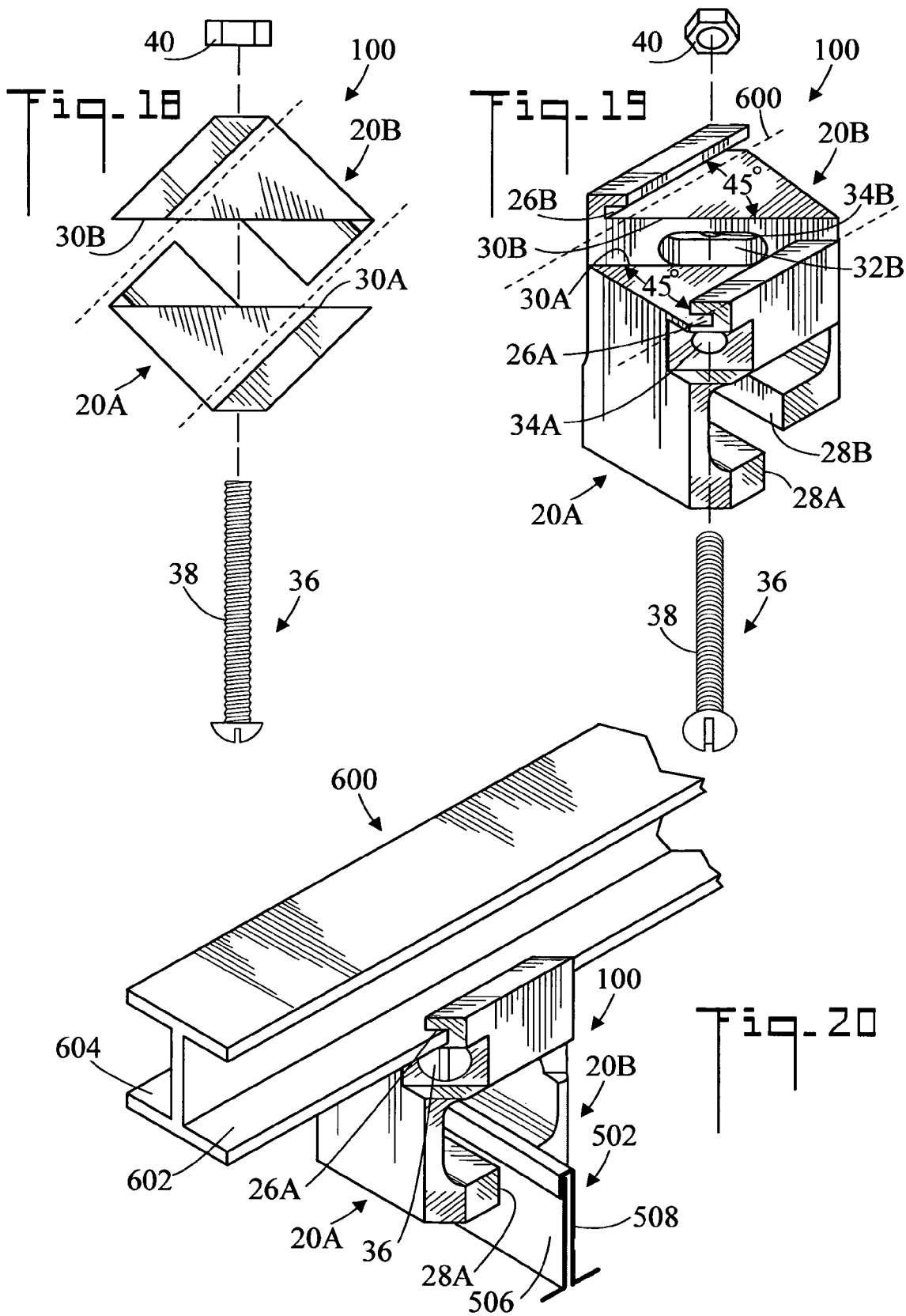

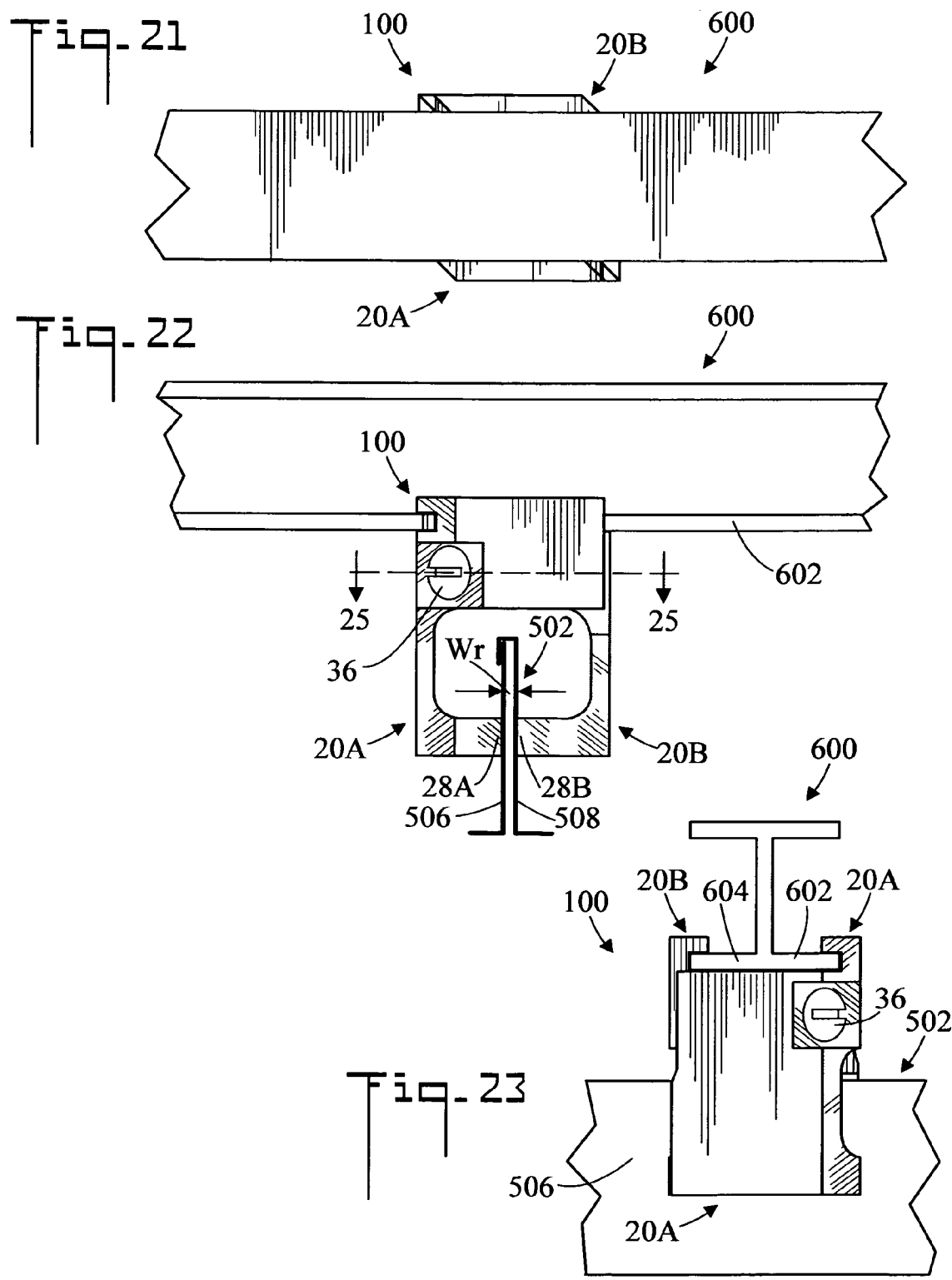

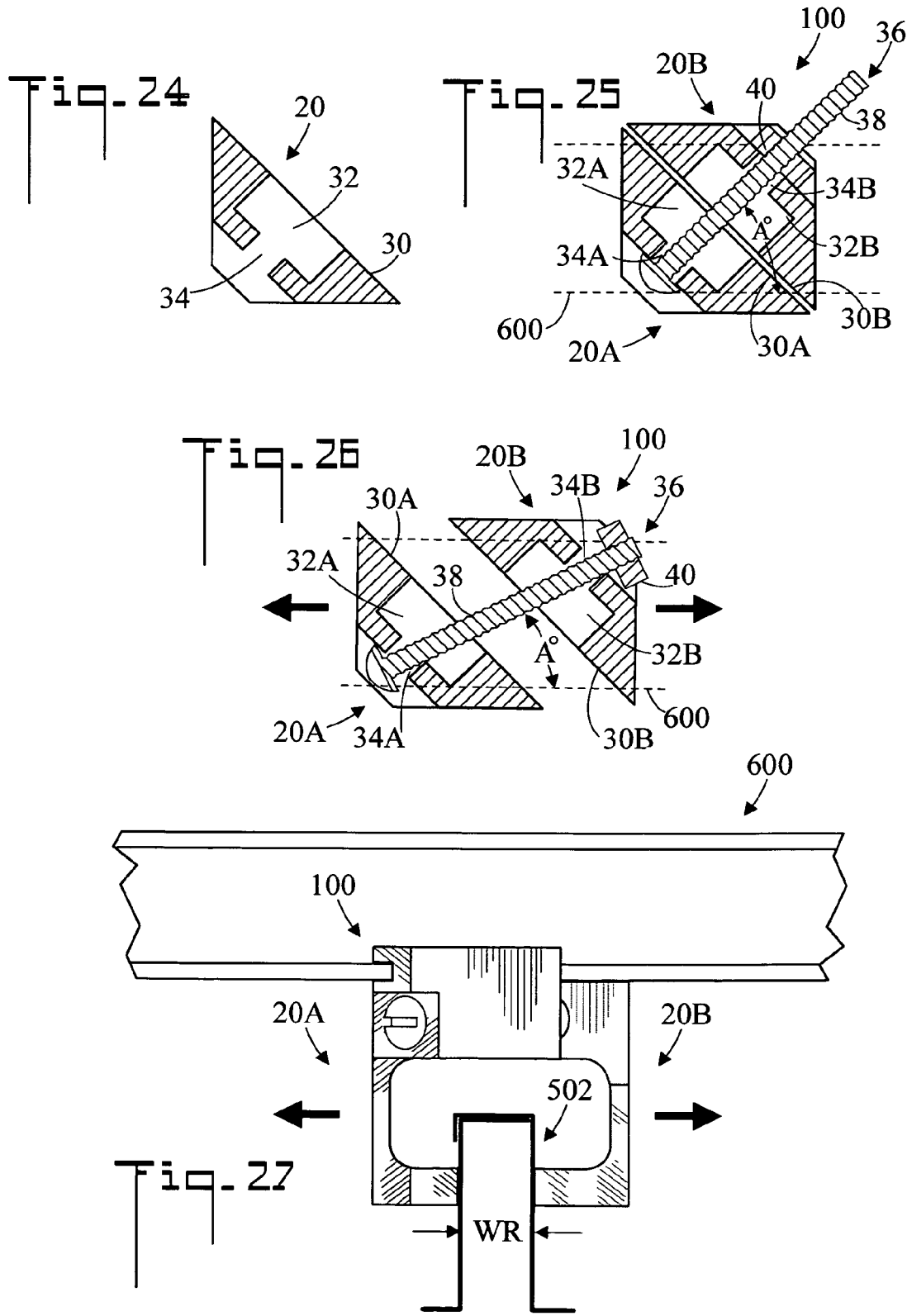

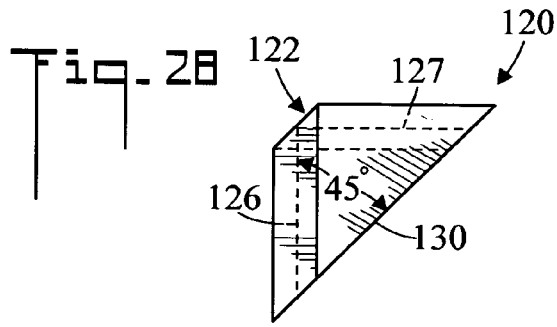
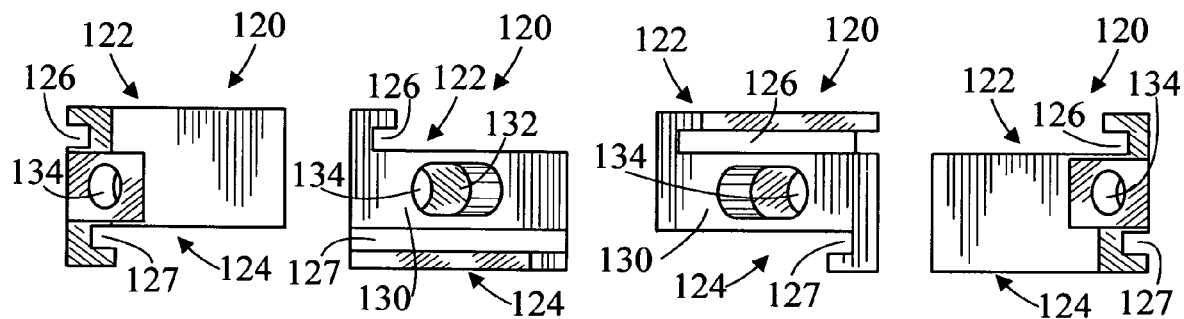
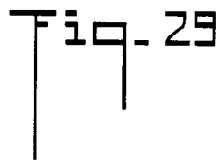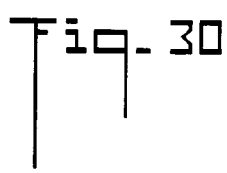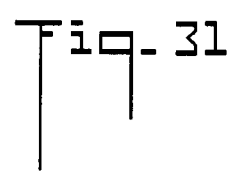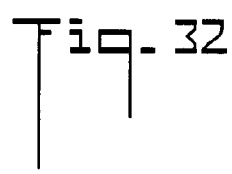
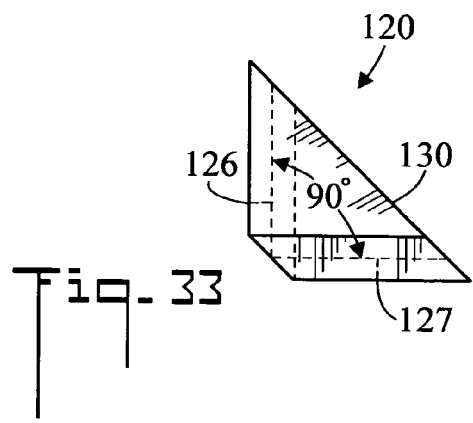

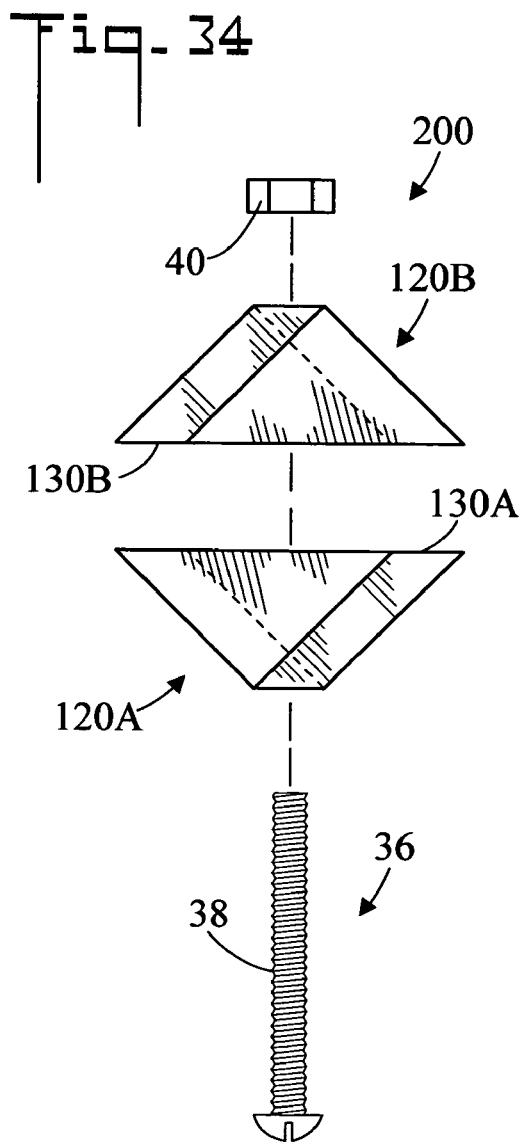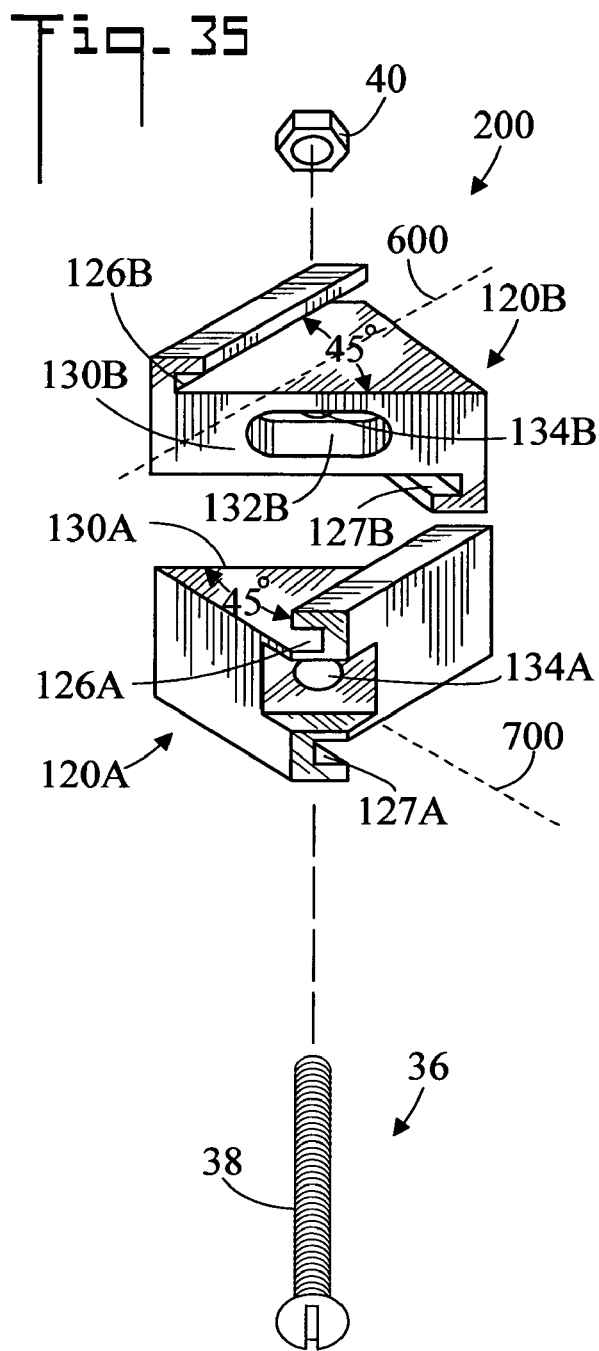

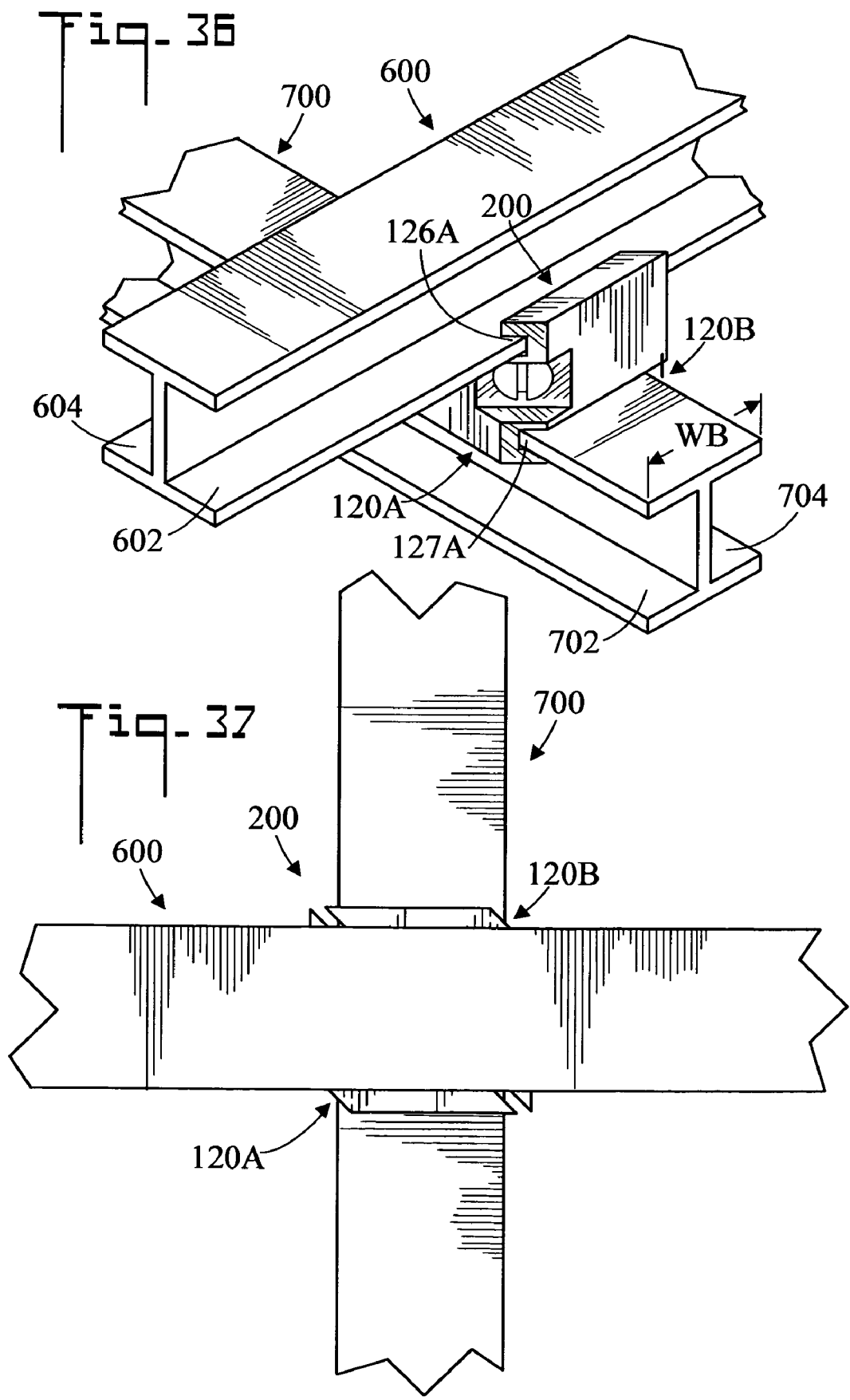

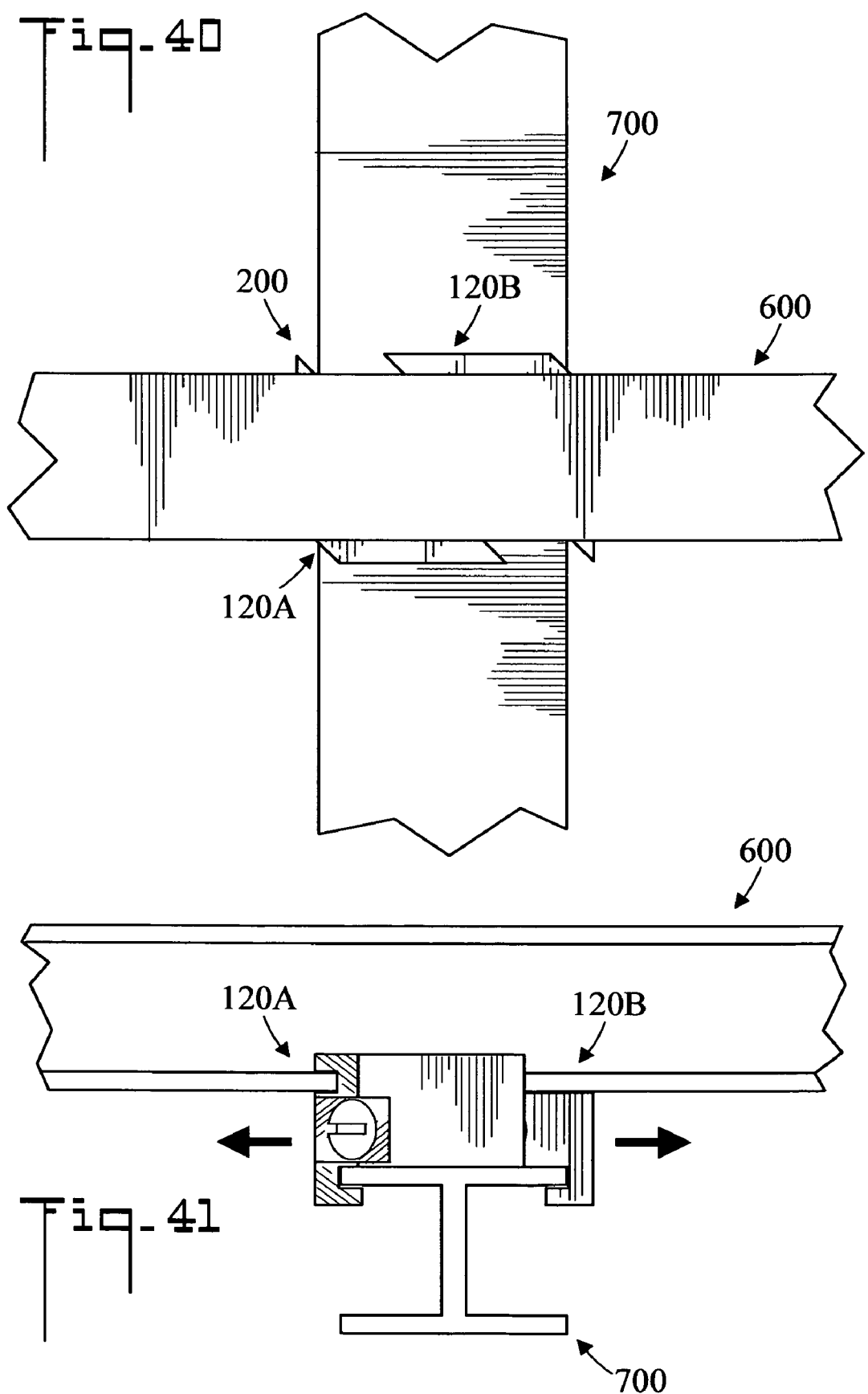

CLAMP FOR CONNECTING TWO ELONGATED MEMBERS AND METHOD OF USE

CROSS REFERENCE TO RELATED APPLICATION

None

TECHNICAL FIELD

The present invention pertains generally to clamps, and more particularly to a clamp which connects two elongated members together in perpendicular relationship.

BACKGROUND OF THE INVENTION

In various industries there can be a need to connect two elongated members together in perpendicular relationship. For example, in the roofing industry standing seam roofs comprise a plurality of parallel upright ridges which form the joint between adjacent roof panels. If it is desired to connect a device such as a solar panel to the roof, a clamping means is required to perpendicularly connect a supporting beam between two or more roof ridges. Similarly, it is sometimes desired to connect two beams together.

BRIEF SUMMARY OF THE INVENTION

The present invention is directed to a clamp for connecting two elongated members together in perpendicular relationship. In one embodiment of the present invention the clamp is designed to connect a beam (such as an I-beam) to a ridge (such as that found on a standing seam roof). In another embodiment the clamp is designed to connect two beams together. It may be appreciated however, that other applications are also possible.

The clamps of the present invention include two interchangeable half clamps, which are placed in opposing relationship and tightened around the perpendicular junction of the two elongated members. Since the two half clamps are interchangeable, and have the same form, fit, and function, manufacturing costs are reduced, and the installation process is simplified.

In accordance with a preferred embodiment of the present invention, a clamp connects a beam to a ridge. The beam has a first flange and an opposite second flange, and the ridge has a first side, an opposite second side, and a width. The clamp includes a first half clamp which has a first end and an opposite second end. The first end of the first half clamp includes a first channel which is shaped and dimensioned to receive the first flange of the beam. The second end of the first half clamp includes a first jaw which is oriented perpendicular to the first channel. The clamp also includes a second half clamp which has a first end and an opposite second end. The first end of the second half clamp includes a second channel which is shaped and dimensioned to receive the second flange of the beam. The second end of the second half clamp includes a second jaw which is oriented perpendicular to the second channel. The first and second half clamps are positionable so that (1) the first channel of the first half clamp receives the first flange of the beam, and the second channel of the second half clamp receives the second flange of the beam, and (2) the first jaw of the first half clamp engages the first side of the ridge and the second jaw of the second half clamp engages the second side of the ridge.

In accordance with an aspect of the invention, the first and second half clamps have the same size and shape and are therefore interchangeable.

In accordance with another aspect of the invention, a tightener urges the first and second half clamps toward each until the clamp firmly locks the beam and ridge together. In an embodiment of the invention, the tightener is a bolt and nut.

In accordance with another aspect of the invention, the clamp can accommodate ridges of different widths.

In accordance with another embodiment of the invention, a clamp connects a first beam to a second beam, the first beam having a first flange and an opposite second flange, the second beam having a first flange and an opposite second flange, and a width. The clamp includes a first half clamp having a first end and an opposite second end. The first end of the first half clamp includes a first channel which is shaped and dimensioned to receive the first flange of the first beam. The second end of the first half clamp includes a second channel which is shaped and dimension to receive the first flange of the second beam, wherein the second channel of the first half clamp is oriented perpendicular to the first channel of the first half clamp. The clamp also includes a second half clamp having a first end and an opposite second end. The first end of the second half clamp includes a first channel which is shaped and dimensioned to receive the second flange of the first beam. The second end of the second half clamp includes a second channel which is shaped and dimension to receive the second flange of the second beam, wherein the second channel of the second half clamp is oriented perpendicular to the first channel of the second half clamp. The first and second half clamps are positionable so that (1) the first channel of the first half clamp receives the first flange the first beam, and the first channel of the second half clamp receives the second flange of the first beam, and (2) the second channel of the first half clamp receives the first flange of the second beam, and the second channel of the second half clamp receives the second flange of the second beam.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a reduced perspective view of a standing seam roof;

FIG. 2 is an end elevation view of a ridge of the standing seam roof;

FIG. 3 is an end elevation view of a wider ridge;

FIG. 8 is a front perspective view of a half clamp for connecting a beam to a ridge in accordance with the present invention;

FIG. 9 is a rear perspective view of the half clamp;

FIG. 10 is a front elevation view of the half clamp;

FIG. 11 is a rear elevation view of the half clamp;

FIG. 12 is a top plan view of the half clamp;

FIG. 13 is first side elevation view of the half clamp;

FIG. 14 is a second side elevation view of the half clamp;

FIG. 15 is a third side elevation view of the half clamp;

FIG. 16 is a fourth side elevation view of the half clamp;

FIG. 17 is a bottom plan view of the half clamp;

FIG. 18 is an exploded top plan view of a clamp for connecting a beam to a ridge in accordance with the present invention;

FIG. 19 is an exploded perspective view of the clamp;

FIG. 20 is a fragmented perspective view of the clamp connecting a beam to a ridge;

FIG. 21 is a fragmented top plan view of the clamp connecting the beam to the ridge;

FIG. 22 is a fragmented side elevation view of the clamp connecting the beam to the ridge;

FIG. 23 is a fragmented end elevation view of the clamp connecting the beam to the ridge;

FIG. 24 is a cross sectional view along the line 24-24 of FIG. 10;

FIG. 25 is a cross sectional view of the clamp along line 25-25 of FIG. 22;

FIG. 26 is another cross sectional view of the clamp connecting a wider ridge to the beam;

FIG. 27 is a fragmented side elevation view of the clamp shown in FIG. 26;

FIG. 28 is a top plan view of a half clamp for connecting a first beam to a second beam;

FIG. 29 is first side elevation view of the half clamp;

FIG. 30 is a second side elevation view of the half clamp;

FIG. 31 is a third side elevation view of the half clamp;

FIG. 32 is a fourth side elevation view of the half clamp;

FIG. 33 is a bottom plan view of the half clamp;

FIG. 34 is an exploded top plan view of a clamp for connecting the first beam to the second beam in accordance with the present invention;

FIG. 35 is an exploded perspective view of the clamp;

FIG. 36 is a fragmented perspective view of the clamp connecting the first beam to the second beam;

FIG. 37 is a fragmented top plan view of the clamp connecting the first beam to the second beam;

FIG. 40 is a fragmented top plan view of the clamp connecting the first beam to a wider second beam;

FIG. 41 is a fragmented side elevation view of the clamp shown in FIG. 40;

DETAILED DESCRIPTION OF THE INVENTION

Figure 4:
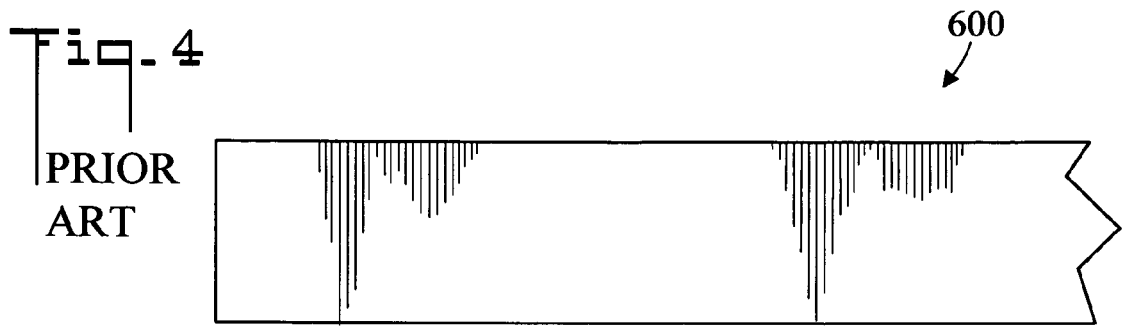
FIG. 4 is a fragmented top plan view of a beam.

Referring initially to FIG. 1, there is illustrated a reduced perspective view of a standing seem roof 500. Standing seam roof 500 includes a plurality of upright ridges 502 which comprise the junction of two adjacent roof panels 504. FIG. 2 is an end elevation view of ridge 502 of standing seam roof 500. Ridge 502 has a first side 506, an opposite second side 508, and a width Wr. FIG. 3 is an end elevation view of a wider ridge 502, having a width WR which is greater than width Wr. It is noted that in some applications, ridge 502 can simply be a piece of sheet metal.

Figure 5:
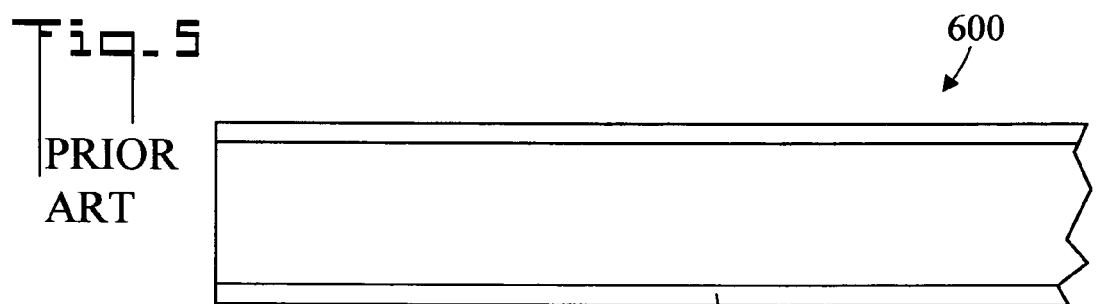
FIG. 5 is a fragmented side elevation view of the beam.
Figure 6:
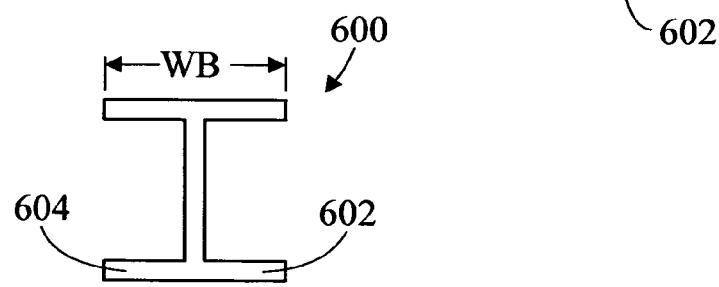
FIG. 6 is an end elevation view of the beam.
Figure 7:
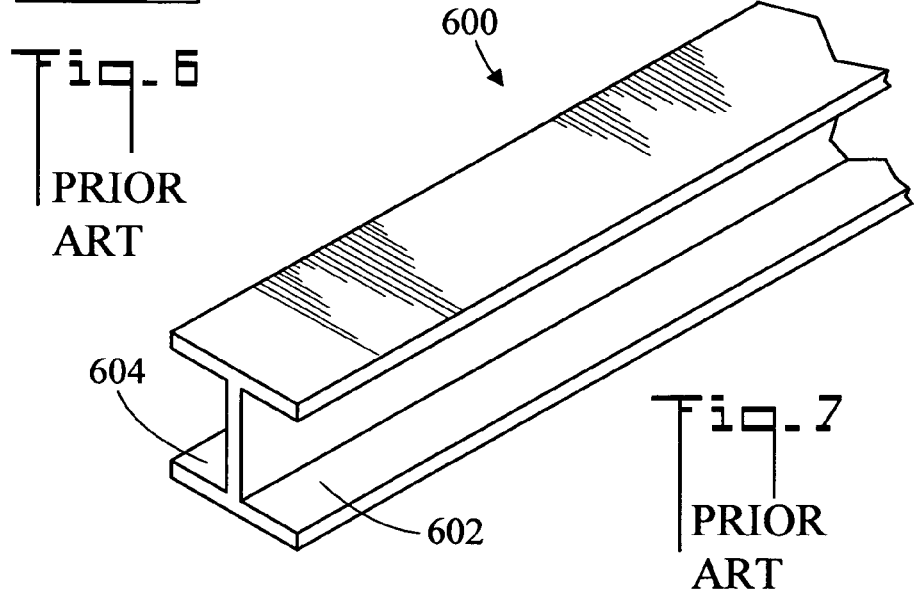
FIG. 7 is a fragmented perspective view of the beam.
Figure 38:
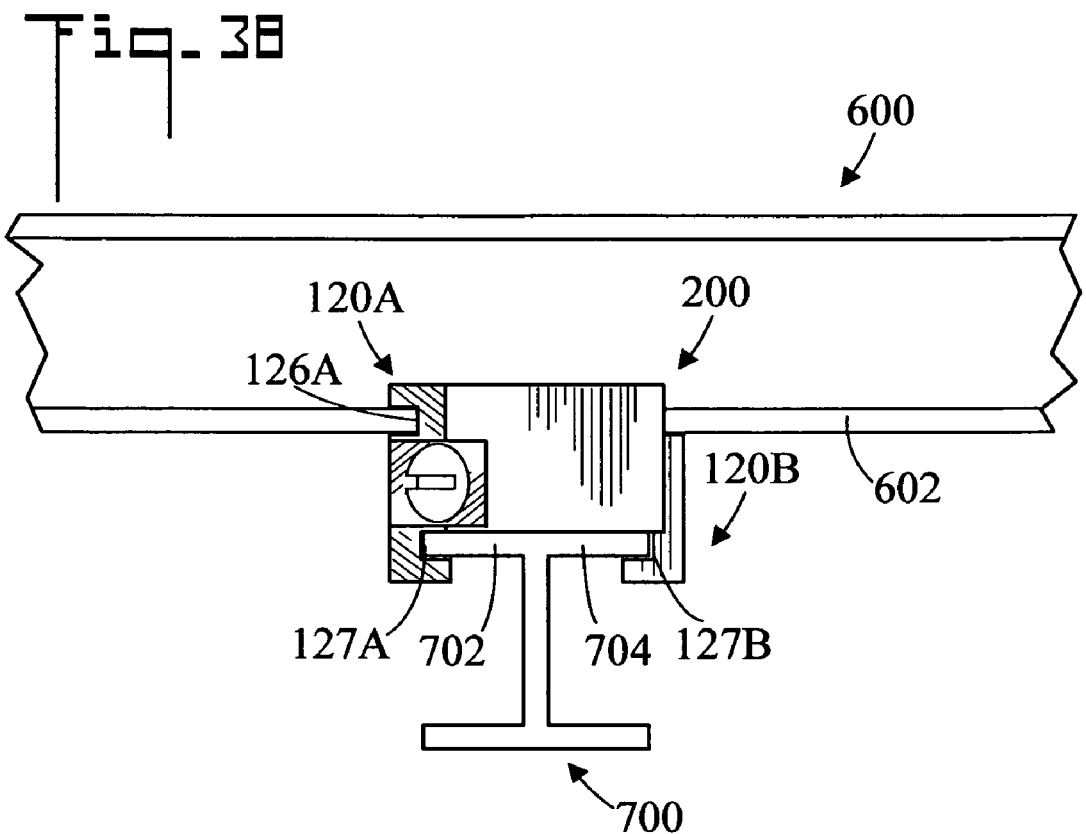
FIG. 38 is a fragmented side elevation view of the clamp connecting the first beam to the second beam.
Figure 39:
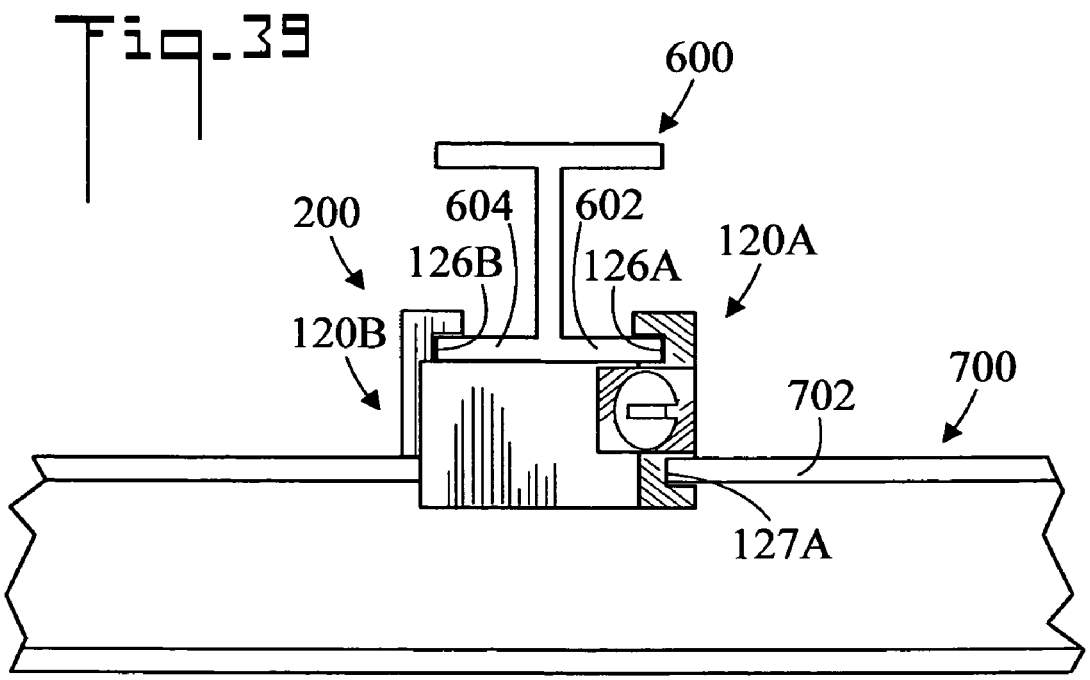
FIG. 39 is a fragmented end elevation view of the clamp connecting the first beam to the second beam.

FIGS. 4, 5, and 7 are fragmented top elevation, side elevation, and perspective views respectively of a beam 600, and FIG. 6 is an end view of beam 600. In the shown embodiment, beam 600 is an I-beam which has a first flange 602, an opposite second flange 604, and a width WB Also referring to FIG. 42, the clamp of the present invention connects beam 600 to ridges 502 of standing seam roof 500.

FIGS. 8-17 shown multiple views of a half clamp for connecting beam 600 to ridge 502 in accordance with the present invention, the half clamp generally designated as 20 (refer also to FIGS. 1-7). Half clamp 20 has a first end 22 and an opposite second end 24. First end 22 includes a channel 26 shaped and dimensioned to receive the flange (602 or 604) of beam 600. Second end 24 includes a jaw 28 which is oriented perpendicular to channel 26. Half clamp 20 has a planar face 30 which forms a 45° angle with channel 26. A cavity 32 is disposed in planar face 30. Half clamp 20 has an aperture 34 which is disposed between channel 26 and jaw 28, and opens into cavity 32.

Now referring to FIGS. 18 and 19, there are illustrated exploded top plan and perspective views respectively of a clamp for connecting beam 600 to ridge 502 (refer to FIGS. 1-7) in accordance with the present invention, the clamp generally designated as 100. FIG. 20 is a perspective view showing clamp 100 connecting beam 600 to ridge 502. It is noted that clamp 100 includes two half clamps 20A and 20B which are positioned in the shown opposing relationship. Also referring to FIGS. 8-17, clamp 100 includes a first half clamp 20A having a first end and an opposite second end. First end of first half clamp 20A includes a first channel 26A which is shaped and dimensioned to receive first flange 602 of beam 600. Second end of first half clamp 20A includes a first jaw 28A, wherein first jaw 28A is oriented perpendicular to first channel 26A. Clamp 100 further includes a second half clamp 20B having a first end and an opposite second end. First end of second half clamp 20B includes a second channel 26B which is shaped and dimensioned to receive second flange 604 of beam 600. Second end of second half clamp 20B includes a second jaw 28B, wherein second jaw 28B is oriented perpendicular to second channel 26B. It is noted that the dashed lines in FIGS. 18 and 19 represent the position of beam 600 with respect to clamp 100 (also refer to FIGS. 20-23). It is further noted that first half clamp 20A has a first shape and size, and that second half clamp 20B has a second shape and size, and that the first shape and size is the same as the second shape and size. In other words, first half clamp 20A and second half clamp 20B are interchangeable. This feature facilitates both manufacture and installation since only one half clamp 20 design is required.

FIG. 19 shows that first half clamp 20A has a first planar face 30A which forms a 45° angle with first channel 26A, and that second half clamp 20B has a second planar face 30B which forms a 45° angle with second channel 26B. To form clamp 100, first planar face 30A and second planar face 30B are turned toward each other as shown.

Clamp 100 further includes a tightener for urging first half clamp 20A and second half clamp 20B toward one another. In the shown embodiment, the tightener includes first half clamp 20A having a first aperture 34A disposed between first channel 26A and first jaw 28A. Second half clamp 20B has a second aperture 34B disposed between second channel 26 B and second jaw 28B. The tightener further includes a bolt 36 which has a shank 38 which is shaped and dimensioned to pass through first 34A and second 34B apertures, and a nut 40 for threadably engaging bolt 36. Shank 38 of bolt 36 passes through both first aperture 34A and second aperture 34B, nut 40 is connected to bolt 36, and bolt 36 and nut 40 tightened, thereby causing first half clamp 20A and second half clamp 20B to be urged together.

Now referring to FIGS. 20-23, there are illustrated fragmented perspective, top plan, side elevation, and end elevation views respectively of clamp 100 perpendicularly connecting beam 600 to ridge 502. First 20A and second 20B half clamps are positionable so that (1) first channel 26A of first half clamp 20A receives first flange 602 of beam 600, and second channel 26B of second half clamp 20B receives second flange 604 of beam 600, and (2) first jaw 28A of first half clamp 20A engages first side 506 of ridge 502 and second jaw 28B of second half clamp 20B engages second side 508 of ridge 502. Also referring to FIGS. 18, 19, and 25, when bolt 38 and nut 40 are tightened, first half clamp 20A and second half clamp 20B are urged together, thereby causing first channel 26A and second channel 26B to tighten around first 602 and second 604 flanges of beam 600 respectively, and first jaw 28A and second jaw 28B to tighten around first 506 and second 508 sides of ridge 502. In this fashion beam 600 and ridge 502 are firmly connected together by clamp 100, wherein beam 600 is perpendicular to ridge 502. Also refer to FIG. 42 for a view showing how clamp 100 connects beam 600 to the ridge 502 of a standing seam roof 500.

FIG. 24 is a cross sectional view along the line 24-24 of FIG. 10, showing half clamp 20, cavity 32, aperture 34, and planar face 30. FIG. 25 is a cross sectional view of clamp 100 along line 25-25 of FIG. 22. It is noted that the dashed lines in FIG. 25 represent the position of beam 600 with respect to clamp 100 (also refer to FIGS. 20-23). First half clamp 20A has a first planar face 30A, a first cavity 32A disposed in first planar face 30A, and aperture 34A opening into first cavity 32A. Similarly, second half clamp 20B has a second planar face 30B, a second cavity 32 B disposed in second planar face 30B, and second aperture 34B opening into second cavity 32B. It is noted that in the installed configuration, first planar face 30A is always parallel to second planar face 30B.

FIG. 26 is another cross sectional view of clamp 100 connecting a wider (with respect to FIGS. 20-23) ridge 502 to beam 600, and FIG. 27 is a fragmented side elevation view of clamp 100, beam 600, and wider ridge 502 as shown in FIG. 26. It is noted that cavities 32A and 32B permit shank 38 of bolt 36 to form a variable angle A with beam 600, wherein angle A is defined by the width WR of ridge 502. That is, cavities 32A and 32B allow bolt 36 to form a smaller angle A than the approximate 45° of FIG. 25. To accommodate a wider ridge 502, it is noted that first half clamp 20A and second half clamp 20B must move further apart (in the direction of the arrows) along beam 600, as compared to the narrower ridge 502 shown in FIGS. 20-23. Conversely, to accommodate a narrower ridge 502, first half clamp 20A and second half clamp 20B must move closer together along beam 600. This is a very useful feature of the present invention, and allows clamp 100 to be used with a variety of ridge 502 widths.

In terms of use, a method for connecting a beam 600 to a ridge 502 includes: (refer to FIGS. 1-27)

(a) providing a beam 600 having a first flange 602 and an opposite second flange 604;

(b) providing a ridge 502 having a first side 506, an opposite second side 508, and a width (Wr or WR);

(c) providing a clamp 100 for connecting beam 600 to ridge 502, clamp 100 including;

a first half clamp 20A having a first end 22A and an opposite second end 24A;

first end 22A of first half clamp 20A including a first channel 26A shaped and dimensioned to receive first flange 602 of beam 600;

second end 24 of first half clamp 20A including a first jaw 28A, first jaw 28A oriented perpendicular to first channel 26A;

a second half clamp 20B having a first end 22B and an opposite second end 24B;

first end 22B of second half clamp 20B including a second channel 26B shaped and dimensioned to receive second flange 604 of beam 600;

second end 24B of second half clamp 20B including a second jaw 28B, second jaw 28B oriented perpendicular to second channel 26B;

a tightener for urging first half clamp 20A and second half clamp 20B toward one another;

(d) positioning first 20A and second half 20B clamps so that (1) first channel 26A of, first half clamp 26B receives first flange 602, and second channel 26B of second half clamp 20B receives second flange 604, and (2) first jaw 28A of first half clamp 20A engages first side 506 of ridge 502 and second jaw 28B of second half clamp 20B engages second side 508 of ridge 502; and, (e) using the tightener to urge first half clamp 20A and second half clamp 20B toward one another until beam 600 and ridge 502 are firmly connected together in perpendicular relationship.

The method further including:

in step (c), first half clamp 20A having a first planar face 30A which forms a 45° angle with first channel 26A;

in step (c) second half clamp 20B having a second planar face 30B which forms a 45° angle with second channel 26B; and, in step (d), the positioning including causing first 30A and second 30B planar faces to be turned toward each other.

The method further including:

in step (c), first half clamp 20A having a first shape and size;

in step (c), second half clamp 20B having a second shape and size; and, the first shape and size being the same as the second shape and size.

The method further including:

in step (c), the tightener including;

first half clamp 20A having a first aperture 34A disposed between first channel 26A and first jaw 28A, second half clamp 20B having a second aperture 34B disposed between second channel 26B and second jaw 28B, a bolt 36 having a shank 38 which is shaped and dimensioned to pass through first 34A and second 34B apertures, and a nut 40 for threadably engaging bolt 36; and, in step (d), passing shank 38 of bolt 36 through both first aperture 34A and second aperture 34B, connecting nut 40 to bolt 36, and tightening bolt 36 and nut 40.

The method further including:

in step (c), first half clamp 20A has a first planar face 30A, a first cavity 32A disposed in first planar face 30A, first aperture 34A opening into first cavity 32A;

in step (c), second half clamp 20B having a second planar face 30B, a second cavity 32B disposed in second planar face 30B, second aperture 34B opening into second cavity 32B; and, in step (c), first 32A and second 32B cavities permitting shank 38 of bolt 36 to form a variable angle A with beam 600, angle A defined by the width of ridge 502 (Wr or WR).

Now referring to FIGS. 28-33 there are illustrated multiple views of a second embodiment of the present invention. The second embodiment comprises a half clamp for connecting a first beam 600 to a second beam 700, the half clamp generally designated as 120 (refer also to FIG. 36). In this embodiment, the half clamp has two flange-receiving channels, instead of one flange-receiving channel and one ridge-engaging jaw as in embodiment 100. As shown in FIG. 36, first beam 600 has a first flange 602 and an opposite second flange 604, and second beam 700 has a first flange 702, an opposite second flange 704, and a width WB. Also referring to FIGS. 28-33, half clamp 120 has a first end 122 and an opposite second end 124.

First end 122 includes a first channel 126 which is shaped and dimensioned to receive first flange 602 of first beam 600. Second end 124 includes a second channel 127 which is shaped and dimensioned to receive first flange 702 of second beam 700. Second channel 127 is oriented perpendicular (90°) to first channel 126. Half clamp 120 has a planar face 130 which forms a 45° angle with first channel 126, and also forms a 45° angle with second channel 127, since first channel 126 and second channel 127 are perpendicular. A cavity 132 is disposed in planar face 130. Half clamp 120 has an aperture 134 which is disposed between first channel 126 and second channel 127, and opens into cavity 132.

Now referring to FIGS. 34 and 35, there are illustrated exploded top plan and perspective views respectively of a clamp for connecting first beam 600 to second beam 700 in accordance with the present invention, the clamp generally designated as 200. FIG. 36 is a perspective view showing clamp 200 connecting first beam 600 to second beam 700. It is noted that clamp 200 includes two half clamps 120A and 120B which are positioned in the shown opposing relationship. Also referring to FIGS. 28-33, clamp 200 includes a first half clamp 120A which has a first end and an opposite second end. First end of first half clamp 120A includes a first channel 126A which is shaped and dimensioned to receive first flange 602 of first beam 600. Second end of first half clamp 120A includes a second channel 127A which is shaped and dimension to receive first flange 702 of second beam 700, wherein second channel 127A of first half clamp 120A is oriented perpendicular to first channel 126A of first half clamp 120A. Clamp 200 further includes a second half clamp 120B which has a first end and an opposite second end. First end of second half clamp 120B includes a first channel 126B which is shaped and dimensioned to receive second flange 604 of first beam 600. Second end of second half clamp 120B includes a second channel 127B which is shaped and dimension to receive second flange 704 of second beam 700, wherein second channel 127B of second half clamp 120B oriented perpendicular to first channel 126B of second half clamp 120B. It is noted that the dashed lines in FIG. 35 represent the position of beam 600 and beam 700 with respect to clamp 100 (also refer to FIGS. 36-41). It is further noted that first half clamp 120A has a first shape and size, and that second half clamp 120B has a second shape and size, and that the first shape and size is the same as the second shape and size. In other words, first half clamp 120A and second half clamp 120B are interchangeable. This feature facilitates both manufacture and installation since only one half clamp 120 design is required.

FIG. 35 shows that first half clamp 120A has a first planar face 130A which forms a 45° angle with first channel 126A, and that second half clamp 120B has a second planar face 130B which forms a 45° angle with second channel 126B. To form clamp 200, first planar face 130A and second planar face 130B are turned toward each other.

Clamp 200 further includes a tightener for urging first half clamp 120A and second half clamp 120B toward one another. In the shown embodiment, the tightener includes first half clamp 120A having a first aperture 134A disposed between first channel 126A and second channel 127A. Second half clamp 120B has a second aperture 134B disposed between first 126B channel and second channel 127B. A bolt 36 has a shank 38 which is shaped and dimensioned to pass through first 134A and second apertures 134B, and a nut 40 for threadably engaging bolt 36. Shank 38 of bolt 36 passes through both first aperture 134A and second aperture 134B, nut 40 is connected to bolt 36, and bolt 36 and nut 40 are tightened, thereby causing first half clamp 120A and second half clamp 120B to be urged together.

Now referring to FIGS. 36-39, there are illustrated fragmented perspective, top plan, side elevation, and end elevation views respectively of clamp 200 perpendicularly connecting first beam 600 to second beam 700. First 120A and second 120B half clamps are positionable so that (1) first channel 126A of first half clamp 120A receives first flange 602 of first beam 600, and first channel 126B of second half clamp 120B receives second flange 604 of first beam 600, and (2) second channel 127A of first half clamp 120A receives first flange 702 of second beam 700, and second channel 127B of second half clamp 120B receives second flange 704 of second beam 700. Also referring to FIGS. 34 and 35, when bolt 38 and nut 40 are tightened, first half clamp 120A and second half clamp 120B are urged together, thereby causing (1) first channel 126A of first half clamp 120A and first channel 126B of second half claim 120B to tighten around first 602 and second 604 flanges of first beam 600 respectively, and (2) second channel 127A of first half clamp 120A and second channel 127B of second half clamp 120B to tighten around first 702 and second 704 flanges of second beam 700 respectively. In this fashion first beam 600 and second beam 700 are firmly connected together by clamp 200, wherein first beam 600 is perpendicular to second beam 700.

FIG. 40 is a fragmented top plan view of clamp 200 connecting first beam 600 to a wider second beam 700, and FIG. 41 is a fragmented side elevation view of clamp 200 as shown in FIG. 40. Also referring to FIGS. 28-35, first half clamp 120A has a first planar face 130A, a first cavity 132A disposed in first planar face 130A, and first aperture 134A opening into first cavity 132A. Similarly, second half clamp 120B has a second planar face 130B, a second cavity 134B disposed in second planar face 130B, and second aperture 134A opening into second cavity 134B. Cavities 132A and 132B permit shank 38 of bolt 36 to form a variable angle A with first beam 600, wherein angle A is defined by the width of second beam 700. The variable angle A feature of clamp 200 is identical to that of clamp 100 as shown and described in FIGS. 26 and 27, and allows clamp 200 to be used with a variety of second beam 700 widths. To accommodate a wider second beam 700, it is noted that first half clamp 120A and second half clamp 120B must move further apart (in the direction of the arrows) along first beam 600, as compared to the narrower second beam 700 shown in FIGS. 36-39. Conversely, to accommodate a narrower second beam 700, first half clamp 120A and second half clamp 120B must move closer together along beam 600.

In terms of use, a method for connecting a first beam 600 to a second beam 700 includes: (refer to FIGS. 4-7, and FIGS. 28-41)

(a) providing a first beam 600 having a first flange 602 and an opposite second flange 604;

(b) providing a second beam 700 having a first flange 702, an opposite second flange 704, and a width WB;

(c) providing a clamp 200 for connecting first beam 600 to second beam 700, clamp 200 including;

a first half clamp 120A having a first end 122A and an opposite second end 124A;

first end 122A of first half clamp 120A including a first channel 126A which is shaped and dimensioned to receive first flange 602 of first beam 600;

second end 124 of first half clamp 120A including a second channel 127A which is shaped and dimensioned to receive first flange 702 of second beam 700, second channel 127A of first half clamp 120A oriented perpendicular to first channel 126A of first half clamp 120A;

a second half clamp 120B having a first end 122B and an opposite second end 124B;

first end 122A of second half clamp 120B including a first channel 126B which is shaped and dimensioned to receive second flange 604 of first beam 600;

second end 124B of second half clamp 120B including a second channel 127B which is shaped and dimension to receive second flange 704 of second beam 700, second channel 127B of second half clamp 120B oriented perpendicular to first channel 126B of second half clamp 120B;

a tightener for urging first half clamp 120A and second half clamp 120B toward one another;

(d) positioning first 120A and second 120B half clamps so that (1) first channel 126A of first half clamp 120A receives first flange 602 of first beam 600, and first channel 126B of second half clamp 120B receives second flange 604 of first beam 600, and (2) second channel 127A of first half clamp 120A receives first flange 702 of second beam 700, and second channel 127B of second half clamp 120B receives second flange 704 of second beam 700;

(e) using the tightener to urge first half clamp 120A and second half clamp 120B toward one another until first beam 600 and second beam 700 are firmly connected together in perpendicular relationship.

The method further including:

in step (c), first half clamp 120A having a first planar face 130A which forms a 45° angle with first channel 126A of first half clamp 120A;

in step (c) second half clamp 120B having a second planar face 130B which forms a 45° angle with first channel 126B of second half clamp 120B; and, in step (d), the positioning including causing first 130A and second 130B planar faces to be turned toward each other.

The method further including:

in step (c), first half clamp 120A having a first shape and size;

in step (c), second half clamp 120B having a second shape and size; and, the first shape and size being the same as the second shape and size.

The method further including:

in step (c), the tightener including;

first half clamp 120A having a first aperture 134A disposed between first channel 126A of first half clamp 120A and second channel 127A of first half clamp 120A, second half clamp 120B having a second aperture 134B disposed between first channel 126B of second half clamp 120B and second channel 127B of second half clamp 120B, a bolt 36 having a shank 38 which is shaped and dimensioned to pass through first 134A and second 134B apertures, and a nut 40 for threadably engaging bolt 40; and, in step (d), passing shank 38 of bolt 36 through both first aperture 134A and second aperture 134B, connecting nut 40 to bolt 36, and tightening bolt 36 and nut 40.

The method further including:

in step (c), first half clamp 120A having a first planar face 130A, a first cavity 132A disposed in first planar face 130A, and first aperture 134A opening into first cavity 132A;

in step (c), second half clamp 120B having a second planar face 130B, a second cavity 132B disposed in second planar face 130B, and second aperture 134B opening into second cavity 132B; and, in step (c), first 134A and second 134B cavities permitting shank 38 of bolt 36 to form a variable angle A with first beam 600, angle A being defined by the width W of second beam 700.

Figure 42:
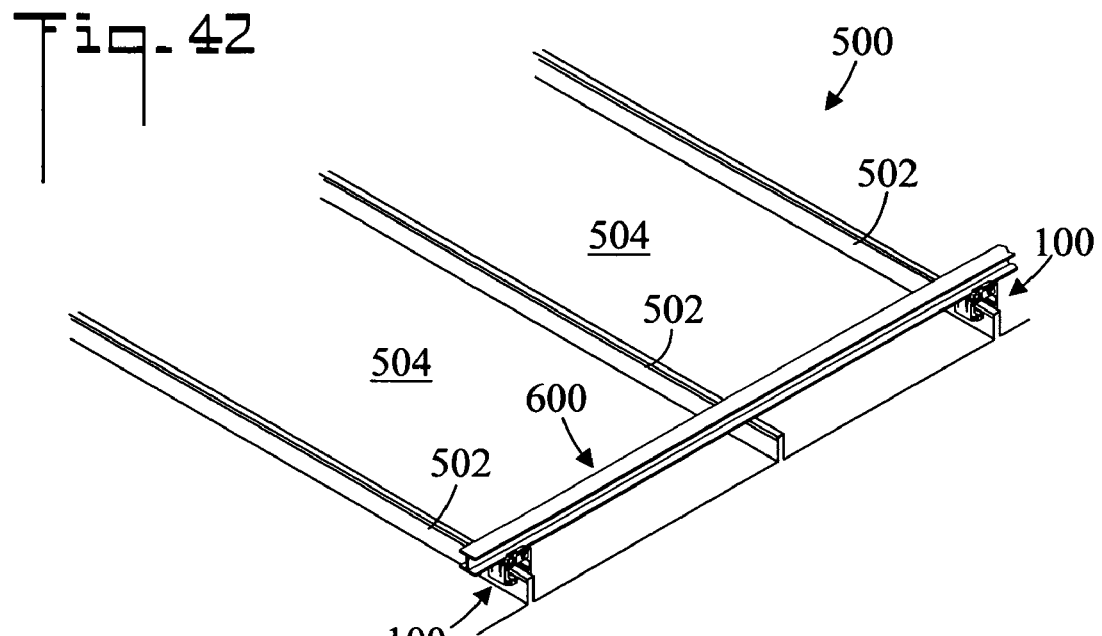
FIG. 42 is a reduced perspective view of the clamp of FIG. 20 connecting a beam to the ridge of a standing seam roof.

FIG. 42 is a reduced perspective view of clamp 100 of FIG. 20 connecting beam 600 to ridge 502 of a standing seam roof 500. It may be appreciated that another structure such as a solar panel could then be connected to beam 600.

Figure 43:
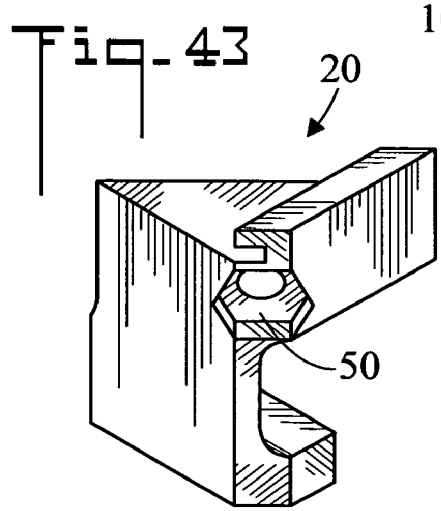
FIG. 43 is a perspective view the half clamp with a hexagonal nut-receiving mortise.

FIG. 43 is a perspective view of half clamp 20 with a hexagonal nut-receiving mortise 50 for receiving nut 40. Nut-receiving mortise 50 facilitates the connection and tightening of the two half clamps.

Figure 44:
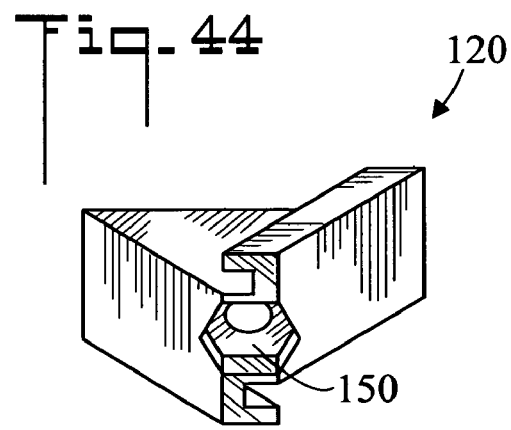
FIG. 44 is a perspective view of the half clamp with a hexagonal nut-receiving mortise; and, FIG. 45 is a cross sectional view of a different embodiment of a cavity in the clamp.

FIG. 44 is a perspective view of half clamp 120 with a hexagonal nut-receiving mortise 150 for receiving nut 40.

Figure 45:
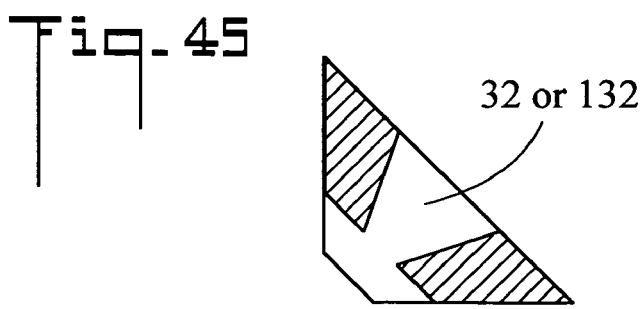

FIG. 45 is a cross sectional view of a different embodiment of cavity 32 or 132 in half clamp 20 or 120 respectively.

The preferred embodiments of the invention described herein are exemplary and numerous modifications, variations, and rearrangements can be readily envisioned to achieve an equivalent result, all of which are intended to be embraced within the scope of the appended claims.

We claim:

1. A clamp for connecting a beam to a ridge, the beam having a first flange and an opposite second flange, the ridge having a first side, an opposite second side, and a width, said clamp comprising:

a first half clamp having a first end and an opposite second end;

said first end of said first half clamp including a first channel shaped and dimensioned to receive the first flange of the beam;

said second end of said first half clamp including a first jaw, said first jaw oriented perpendicular to said first channel;

a second half clamp having a first end and an opposite second end;

said first end of said second half clamp including a second channel shaped and dimensioned to receive the second flange of the beam;

said second end of said second half clamp including a second jaw, said second jaw oriented perpendicular to said second channel;

said first and second half clamps positionable so that (1) said first channel of said first half clamp receives the first flange of the beam, and said second channel of said second half clamp receives the second flange of the beam, and (2) said first jaw of said first half clamp engages the first side of the ridge and said second jaw of said second half clamp engages the second side of the ridge;

a tightener for urging said first half clamp and said second half clamp toward one another, said tightener including:

said first half clamp having a first aperture disposed between said first channel and said first jaw, said second half clamp having a second aperture disposed between said second channel and said second jaw, a bolt having a shank which is shaped and dimensioned to pass through said first and second apertures, and a nut for threadably engaging said bolt, so that said shank of said bolt can be passed through both said first aperture and said second aperture, said nut connected to said bolt, and said bolt and nut tightened;

said first half clamp having a first cavity, said first aperture opening into said first cavity;

said second half clamp having a second cavity, said second aperture opening into said second cavity; and, said cavities permitting said shank of said bolt to form a variable angle with said beam, so that when said bolt and nut are tightened said first half clamp and said second half clamp are different distances apart for different ridge widths.

2. A method for connecting a beam to a ridge, comprising:
(a) providing a beam having a first flange and an opposite second flange;
(b) providing a ridge having a first side, an opposite second side, and a width;
(c) providing a clamp for connecting said beam to said ridge, said clamp including;
   a first half clamp having a first end and an opposite second end;
   said first end of said first half clamp including a first channel shaped and dimensioned to receive the first flange of the beam;
   said second end of said first half clamp including a first jaw, said first jaw oriented perpendicular to said first channel;
   a second half clamp having a first end and an opposite second end;
   said first end of said second half clamp including a second channel shaped and dimensioned to receive the second flange of the beam;
   said second end of said second half clamp including a second jaw, said second jaw oriented perpendicular to said second channel;
   a tightener for urging said first half clamp and said second half clamp toward one another, said tightener including;
      said first half clamp having a first aperture disposed between said first channel and said first jaw,
      said second half clamp having a second aperture disposed between said second channel and said second jaw,
      a bolt having a shank which is shaped and dimensioned to pass through said first and second apertures, and a nut for threadably engaging said bolt;
   said first half clamp having a first cavity, said first aperture opening into said first cavity;
   said second half clamp having a second cavity, said second aperture opening into said second cavity; and,
   said first and second cavities permitting said shank of said bolt to form a variable angle with said beam, so that when said bolt and nut are tightened said first half clamp and said second half clamp are different distances apart for different ridge widths;
(d) positioning said first and second half clamps so that (1) said first channel of said first half clamp receives said first flange, and said second channel of said second half clamp receives said second flange, and (2) said first jaw of said first half clamp engages said first side of said ridge, and said second jaw of said second half clamp engages said second side of said ridge, and passing said shank of said bolt through both said first aperture and said second aperture, and connecting said nut to said bolt; and,
(e) tightening said bolt and nut to urge said first half clamp and said second half clamp toward one another until said beam and said ridge are firmly connected together in perpendicular relationship.

3. A clamp for connecting a first beam to a second beam, the first beam having a first flange and an opposite second flange, the second beam having a first flange and an opposite second flange, and a width, said clamp comprising:
   a first half clamp having a first end and an opposite second end;
   said first end of said first half clamp including a first channel shaped and dimensioned to receive the first flange of the first beam;
   said second end of said first half clamp including a second channel shaped and dimension to receive the first flange of the second beam, said second channel of said first half clamp oriented perpendicular to said first channel of said first half clamp;
   a second half clamp having a first end and an opposite second end;
   said first end of said second half clamp including a first channel shaped and dimensioned to receive the second flange of the first beam;
   said second end of said second half clamp including a second channel shaped and dimension to receive the second flange of the second beam, said second channel of said second half clamp oriented perpendicular to said first channel of said second half clamp;
   said first and second half clamps positionable so that (1) said first channel of said first half clamp receives the first flange the first beam, and said first channel of said second half clamp receives the second flange of the first beam, and (2) said second channel of said first half clamp receives the first flange of the second beam, and said second channel of said second half clamp receives the second flange of the second beam;
   a tightener for urging said first half clamp and said second half clamp toward one another, said tightener including;
      said first half clamp having a first aperture disposed between said first channel and said second channel,
      said second half clamp having a second aperture disposed between said first channel and said second channel,
      a bolt having a shank which is shaped and dimensioned to pass through said first and second apertures, and a nut for threadably engaging said bolt;
      so that said shank of said bolt can be passed through both said first aperture and said second aperture, said nut connected to said bolt, and said bolt and nut tightened;
   said first half clamp having a first cavity, said first aperture opening into said first cavity;
   said second half clamp having a second cavity, said second aperture opening into said second cavity; and,
   said cavities permitting said shank of said bolt to form a variable angle with said first beam, so that when said bolt and nut are tightened said first half clamp and said second half clamp are different distances apart for different second beam widths.

4. A method for connecting a first beam to a second beam, comprising:
(a) providing a first beam having a first flange and an opposite second flange;
(b) providing a second beam having a first flange, an opposite second flange, and a width;
(c) providing a clamp for connecting said first beam to said second beam, said clamp including;

a first half clamp having a first end and an opposite second end;

said first end of said first half clamp including a first channel shaped and dimensioned to receive said first flange of said first beam;

said second end of said first half clamp including a second channel shaped and dimensioned to receive said first flange of said second beam, said second channel of said first half clamp oriented perpendicular to said first channel of said first half clamp;

a second half clamp having a first end and an opposite second end;

said first end of said second half clamp including a first channel shaped and dimensioned to receive said second flange of said first beam;

said second end of said second half clamp including a second channel shaped and dimension to receive said second flange of said second beam, said second channel of said second half clamp oriented perpendicular to said first channel of said second half clamp;

a tightener for urging said first half clamp and said second half clamp toward one another, said tightener including;

said first half clamp having a first aperture disposed between said first channel and said second channel, said second half clamp having a second aperture disposed between said first channel and said second channel, a bolt having a shank which is shaped and dimensioned to pass through said first and second apertures, and a nut for threadably engaging said bolt;

said first half clamp having a first cavity, said first aperture opening into said first cavity;

said second half clamp having a second cavity, said second aperture opening into said second cavity;

said first and second cavities permitting said shank of said bolt to form a variable angle with said first beam, so that when said bolt and nut are tightened said first half clamp and said second half clamp are different distances apart for different second beam widths;

(d) positioning said first and second half clamps so that (1) said first channel of said first half clamp receives said first flange of said first beam, and said first channel of said second half clamp receives said second flange of said first beam, and (2) said second channel of said first half clamp receives said first flange of said second beam, and said second channel of said second half clamp receives said second flange of said second beam, and passing said shank of said bolt through both said first aperture and said second aperture, and connecting said nut to said bolt; and (e) tightening said bolt and nut to urge said first half clamp and said second half clamp toward one another until said first beam and said second beam are firmly connected together in perpendicular relationship.

\* \* \* \* \*